United States Patent [19]

Krapfenbauer

[11] Patent Number: 5,546,781
[45] Date of Patent: Aug. 20, 1996

[54] PROCESS FOR THE PRODUCTION OF A TOOTHED RACK VIA COLD FORMING, THE RACK PRODUCED THEREBY, AND AN APPARATUS FOR PRACTICING THE PROCESS

[75] Inventor: Hans Krapfenbauer, Kusnacht, Switzerland

[73] Assignee: Ernst Grob AG, Mannedorf, Switzerland

[21] Appl. No.: 183,873

[22] Filed: Jan. 21, 1994

[30] Foreign Application Priority Data

Feb. 25, 1993 [CH] Switzerland ............... 00571/93

[51] Int. Cl.$^6$ ............... B21B 21/00; B21B 1/00; B21B 19; B21B 00
[52] U.S. Cl. ............... 72/191; 72/190; 72/194; 72/95 184
[58] Field of Search ............... 72/95, 100, 184, 72/190, 191, 192, 194, 207, 215, 216, 220

[56] References Cited

U.S. PATENT DOCUMENTS

| | | | |
|---|---|---|---|
| 2,214,883 | 9/1940 | Honeycutt | 72/220 |
| 3,495,428 | 2/1970 | Marcovitch | 72/194 |
| 3,514,985 | 6/1970 | Marcovitch | 72/100 |
| 3,818,735 | 6/1974 | Grob et al. | 72/100 |
| 5,331,834 | 7/1994 | Yoshida | 72/191 |

*Primary Examiner*—Lowell A. Larson
*Assistant Examiner*—Rodney A. Butler
*Attorney, Agent, or Firm*—Greenblum & Bernstein P.L.C.

[57] ABSTRACT

Process for the production of a toothed rack via cold forming, the rack produced thereby, and an apparatus for practicing the process. The cold formed rack workpiece shows multiple traces of cold forming in the toothing direction. During the production process, the workpiece, in the apparatus, is moved transversely to the axis of the rolling head, relative to the rotatably driven rolling head. Rolls, having forming ribs, are rotatably journalled within the rolling head, along at least one helical line, with the rolls rotating with the rolling head in a planetary manner. Thereby, each roll performs, in quick sequence, single rolling steps that overlap each other in the feed direction of the apparatus slide. Therein, the tooth space form-type forming ring ribs engage the workpiece. During the cold forming step of the workpiece, working material is displaced by the forming ring ribs from the bottom land area of the toothings to the top land area of the toothings, during which the top land area of the toothing can also be form rolled. An apparatus for carrying out the method includes a holding device for retaining the workpiece and a driven rolling head, rotatable about its own axis, together with feeding means and a stroke adjustor. Several rollers, each having at least one tooth spaced type forming ring rib, are journalled in the rolling head in a planetary manner.

12 Claims, 4 Drawing Sheets

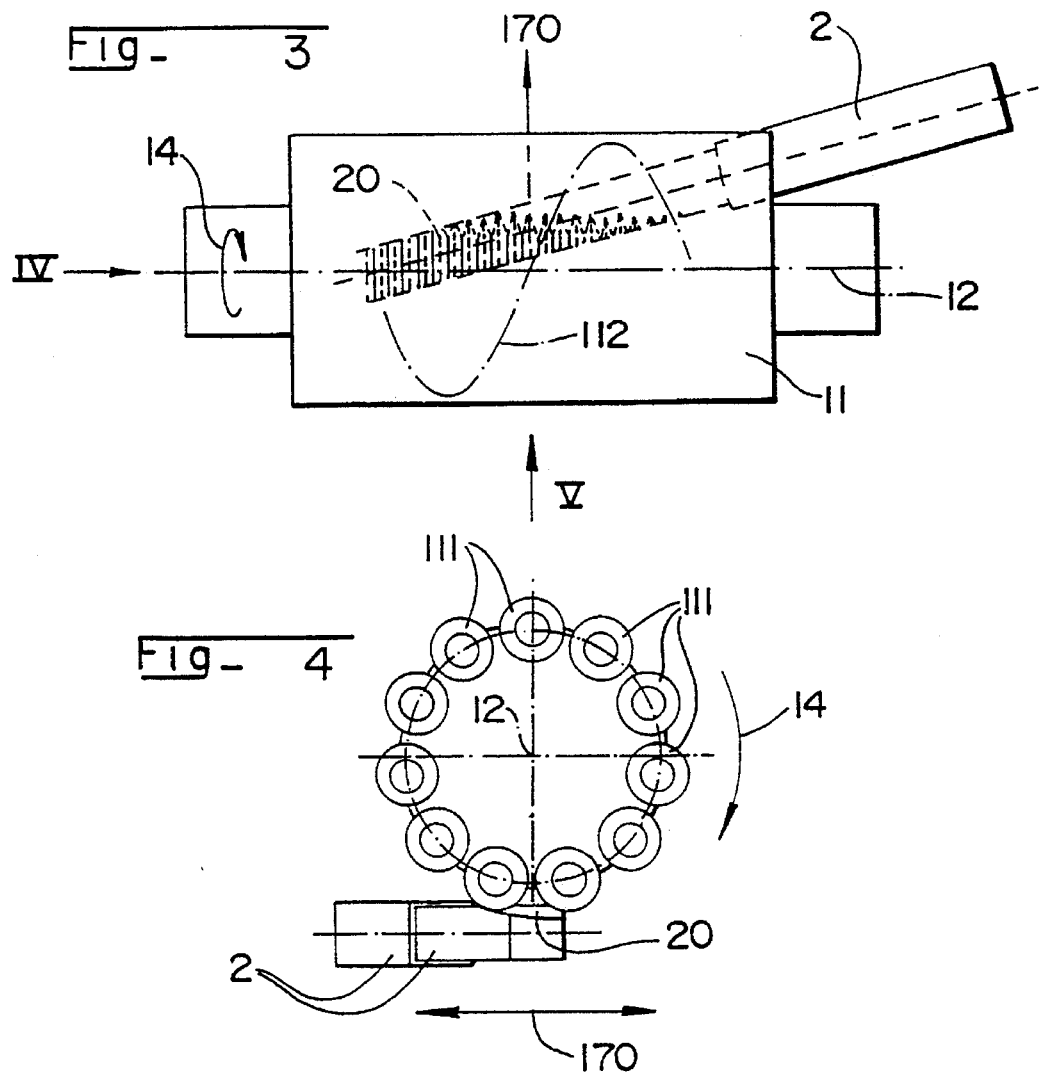
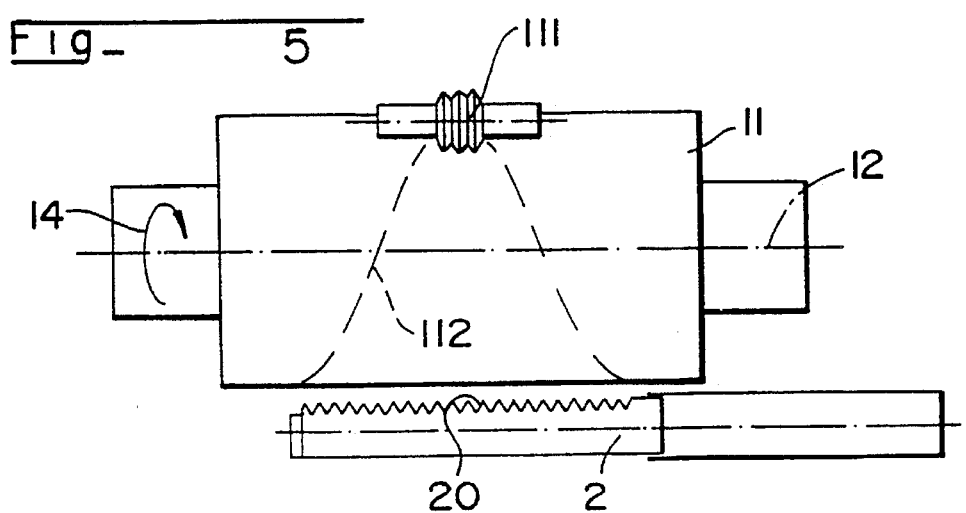

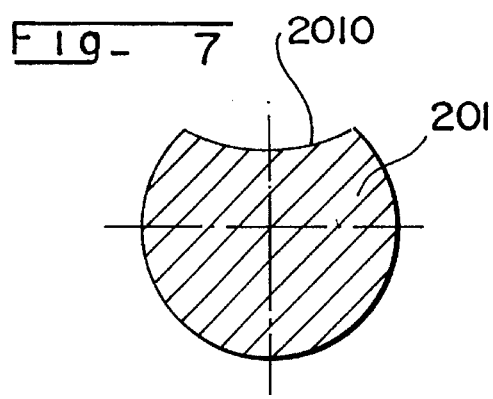
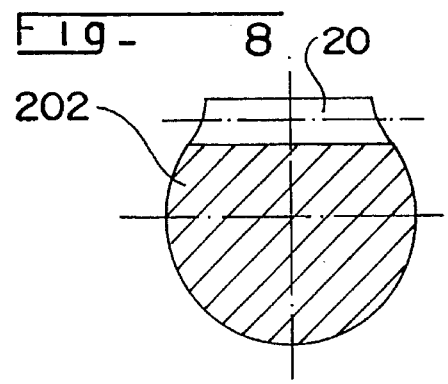
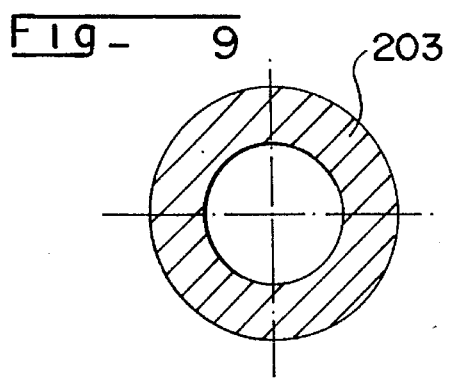
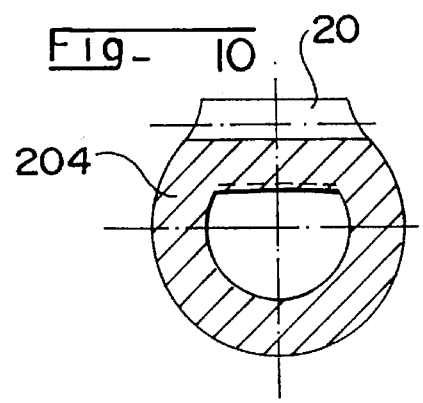
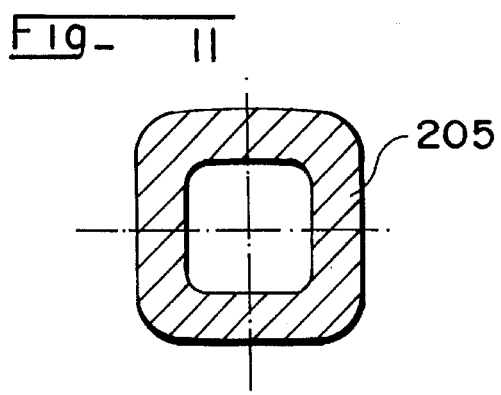
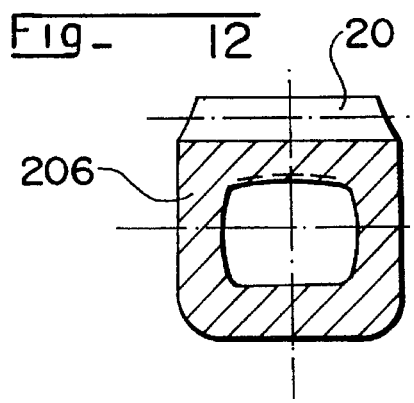

PROCESS FOR THE PRODUCTION OF A TOOTHED RACK VIA COLD FORMING, THE RACK PRODUCED THEREBY, AND AN APPARATUS FOR PRACTICING THE PROCESS

CROSS-REFERENCE TO RELATED APPLICATIONS

This application claims the priority of Swiss Application No. 00 571/93-5, filed Feb. 25, 1993, the disclosure of which is incorporated herein by reference in its entirety.

BACKGROUND OF THE INVENTION

1. Field of the Invention

This invention pertains to a process or a method for the production of a toothed gear-type rack, via cold forming; a rack produced by this method and an apparatus for practicing this method.

2. Discussion of the Background of the Invention and Material Information

Toothed racks having the necessary precision for the more demanding requirements are generally produced by cutting or machining.

The production of toothed racks, via such cutting or machining is uneconomical and time-consuming from both the material and the work effort standpoints, as well as often requiring extensive reworking.

SUMMARY OF THE INVENTION

This invention has the task or object to produce a precise toothed rack without the disadvantages of the known processes. This production should be economically advantageous and efficient, wherein an improvement of the quality of the toothed rack should also be realized.

This object is achieved in the manner set forth in the claims which recite a cold forming method for the production of a toothed rack, the rack produced thereby; and an apparatus for practicing the method.

Specifically this invention pertains to a method for cold forming a toothed rack, wherein the method comprises initiating relative motion transversely to a rolling head axis between a workpiece and a rolling head, the rolling head having a plurality of freely rotating rollers; drivingly revolving the rolling head about a rolling head axis; relatively moving a workpiece blank, to be formed into the toothed rack, during the relative motion with reference to the rolling head axis so that the rollers, rotatably journalled in the rolling head and revolving with the rolling head in a planetary manner, engage the workpiece with the rollers, each of the rollers having at least one tooth space-form-type forming ring rib; performing in quick and overlapping succession, a single rolling process ; and displacing, predominantly from the bottom land area of the toothings to the top land area of the toothings, workpiece material, as a result of the cold forming of the workpiece blank, via the forming ring ribs of the rollers of the rolling head.

In one embodiment of this invention, during the engaging step, each of the rolling head rollers engages only one portion of the toothings being formed on the workpiece blank via the rolling head rollers.

In another embodiment of this invention, during the engaging step, a plurality of multi-ribbed rollers, journalled in the rolling head in a partially overlapping manner in the axial direction, engage partially overlapping portions of the toothings of the workpiece blank to be formed into the toothed rack.

A further embodiment of this invention includes the step of cold rolling a tooth top land area.

An additional embodiment of this invention pertains to a toothed rack produced via the method of this invention wherein the toothed rack can be of solid construction or of a hollow construction.

This invention also pertains to an apparatus for cold rolling a toothed rack comprising a frame; a holding device for clamping a workpiece blank; a driven rolling head, rotatable about its own axis; means for feeding the workpiece blank in a feed direction transverse to the rolling head axis between the holding device and the rolling head; adjustment means for controlling the feed motion of the workpiece blank to the rolling head; and the rolling head including a plurality of rollers, each roller having at least one tooth spaced-type forming ring rib, the rollers being freely rotatably journalled in the rolling head, the rollers revolving in a planetary type manner with the rolling head, along at least one helical line, in order to engage the workpiece blank.

In one embodiment of the apparatus of this invention the rollers are arranged on the rolling head along several helical lines while in another embodiment each roller is arranged next to an adjacent roller, in the axial direction, free of overlap in profile.

In yet a further embodiment of the apparatus of this invention the rollers in the rolling head, in the axial direction, partially overlap each other in profile and preferably utilize multiple forming ring ribs.

The toothed rack, produced by the method of this invention, has high precision and can be produced very quickly, via cold forming, in a single working step, whereby both straight and oblique toothed racks can be so produced, and even the production of toothed racks having alternating or changing pitches can be produced in one working step. The toothed rack can be solid and/or hollow and can have a substantially round and/or polygonal cross section.

In the method of this invention the workpiece is moved in one plane, relative to a rotatably driven rolling head, transversely to the rolling head axis whereby the angular deviation of the movement of a vertical plane, relative to the rolling head axis, determines the obliqueness or straightness of the toothing.

The rolling head utilizes multiple rollers, each of which includes at least one forming ring rib. These rollers, which are rotatably journalled in the rolling head, are arranged along at least on helical line (but could be arranged along several helical lines) in a planetary manner. The rollers engage the workpiece during the relative motion between the rolling head and the workpiece. Therein, a roller carries out a single rolling sequence in quick succession in the feed direction of the slide in an overlapping manner. During these single rolling sequences, via cold forming of the workpiece via the forming ring ribs of the rollers, workpiece material is predominantly displaced from the bottom land areas of the toothings to the top land area of the toothings. At the same time, the top land area of the toothing can also be fully formed, this being accomplished via rolling thereover.

When, in the preferred manner, the rolling head and the rollers are so shaped and arranged that the entire toothing can be rolled in one pass, which is at least feasible with relatively short precision toothings, a toothed rack can be produced per each such pass. At the end of each such pass the finished toothed rack is exchanged for a workpiece blank, so that toothed racks can be produced in quick sequences during which it is possible to work in the same motion or direction as well as in a reverse motion or direction.

Depending upon the material composition and the type of toothed rack, the individual rollers may be so utilized as to engage but a single portion to be toothed. This is independent of whether the individual rollers utilize only one or more forming ring ribs. However, if required, the rollers can be arranged in an axially overlapping manner in the rolling head, so that their working regions, on the toothed rack, also overlap, this achieving a better tooth formation in the overlapping region.

The apparatus for practicing the method of this invention includes a frame, which contains retaining means for clamping or holding the workpiece, with the frame also rotatably journalling a driven rolling head that rotates about its own axis. Means for feeding are utilized for producing relative motion between the clamping means and the rolling head in a direction transverse to the axis of the rolling head, with this feeding means serving mainly for the movement of the clamping means, which preferably take the form of a spindle-driven clamping slide. Further means are also utilized for adjusting the distance between the workpiece and the rolling head, which, for example, achieve a height adjustment of the clamping means. The rollers are preferably rotatably journalled in the rolling head on axes parallel to the rolling head axis. In order to avoid that all rollers are engaged at the same time, which would cause very high loading, the rollers are arranged at least along one helical line, or as the case may be, along several helical lines. Each roller includes at least one forming ring rib which has a profile that corresponds approximately with the profile of the tooth spacing to be formed.

If the rollers are axially arranged next to each other, so that they do not overlap in profile during this rotation, each forming ring rib forms its own tooth spacing. This however can lead to certain deviations, in edge regions, between the engagement positions of individual rollers. Such deviations can generally be avoided if the rollers, in the rolling head, are so arranged in profile, as to be partially overlapping multi-ribbed rollers, since the roller, following the roller that is in current engagement with the workpiece, acts in a tolerance-compensating and shape-improving manner.

The feeding means and stroke adjuster preferably take the form of NC-axes so that a corresponding CNC control can control the rack toothing geometry. As a result thereof, for example, a crowning of the tooth flanks can be achieved.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have generally been used the same reference characters to denote the same or analogous components and wherein:

FIG. 3 is relative to FIGS. 1 and 2, an enlarged top plan view, looking in the direction of arrow III in FIG. 1, down on to the rolling head and an illustrated partially cold rolled workpiece;

FIG. 4 is an end elevation view, looking in the direction of arrow IV in FIG. 3, of the rollers and the workpiece;

FIG. 5 is a front elevation view, looking in the direction of arrow V in FIG. 3, of the rolling head and a finished workpiece;

FIG. 7 is a cross section of a solid workpiece blank with a relieved area which is to be toothed;

FIG. 8 is a cross section of a rack workpiece produced from the workpiece blank shown in FIG. 7;

FIG. 9 is a cross section of a hollow, round, workpiece blank;

FIG. 10 is a cross section of rack workpiece produced from the workpiece blank shown in FIG. 9;

FIG. 11 is a cross section of a hollow, polygonal, workpiece blank; and

FIG. 12 is a cross section of a rack workpiece produced from the workpiece blank shown in FIG. 11.

DETAILED DESCRIPTION OF THE PREFERRED EMBODIMENTS

Figure 1:
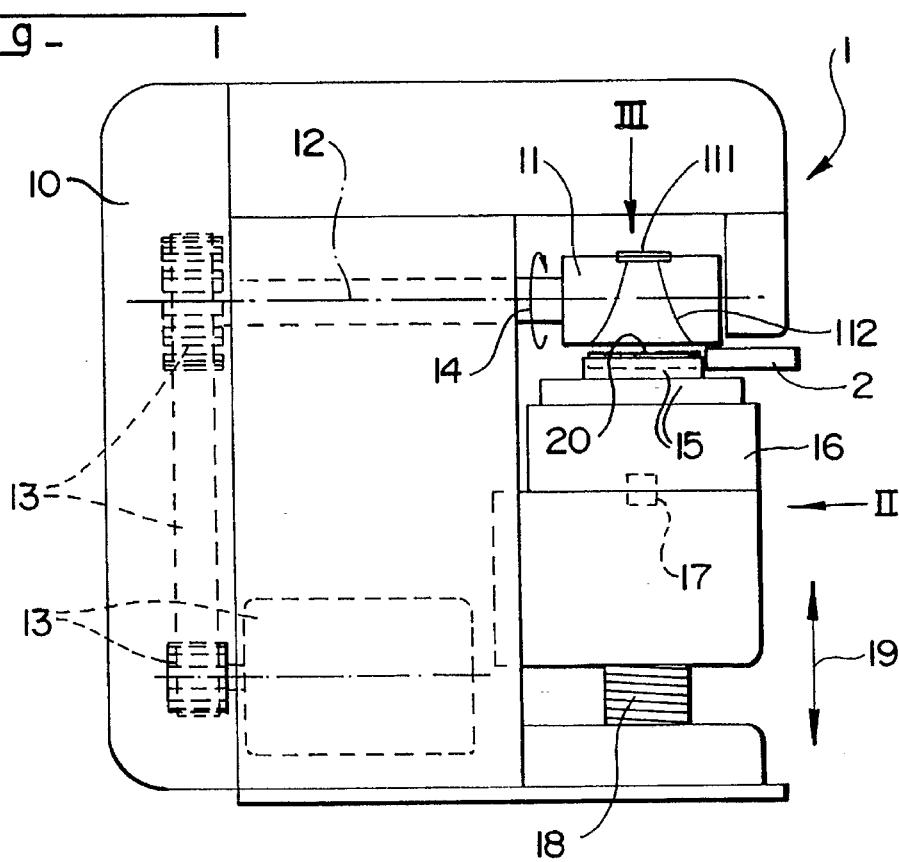
FIG. 1 is a side elevation view of an apparatus, looking in the direction of arrow I in FIG. 2.
Figure 2:
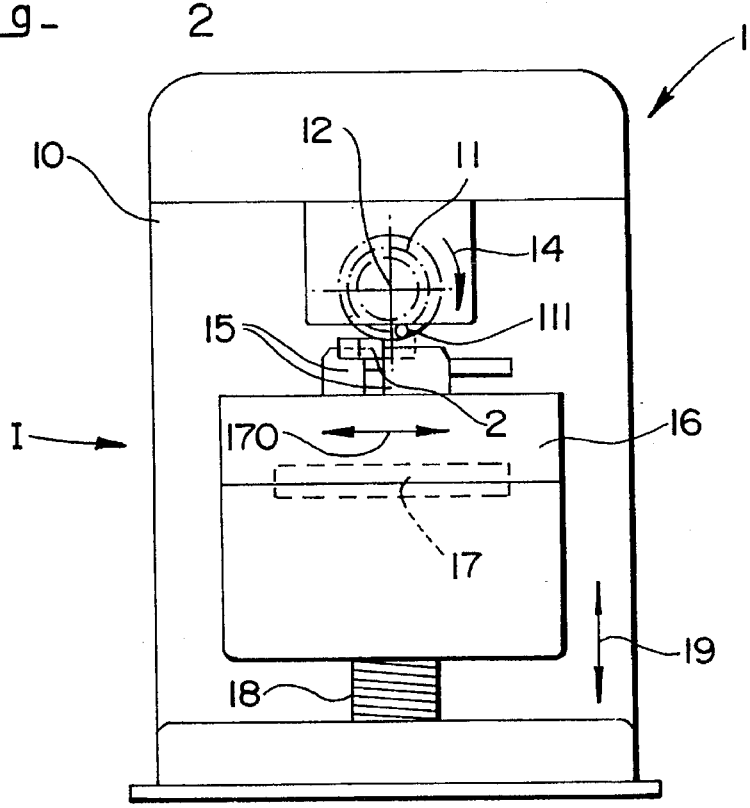
FIG. 2 is a front elevation view of this apparatus, looking in the direction of arrow II in FIG. 1.

With respect to the drawings it is to be understood that only enough of the construction of the invention and the surrounding environment in which the invention is employed have been depicted therein, in order to simplify the illustrations, as needed for those skilled in the art to readily understand the underlying principles and concepts of the invention.

Before beginning an extensive discussion of the drawings, there will now be first listed the various elements and reference characters depicted therein and their significance as follows:

1 device or apparatus 10 frame of device 1

11 rolling head 111 rollers, rotatably journalled in a planetary manner on rolling head 11

112 helical line, helix or spiral—here the only one arranged for rollers 111, but several helical lines could be utilized 113 forming ring ribs—here three per each roller 111—but could vary in number 12 rolling head axis 13 drive for rolling heads 14 direction of rotation/revolution of rolling head 11

15 holding device for the workpiece (rack)

16 slide for the displacement of holding device 15

17 means for feeding (advancing) slide 16

170 feed direction of slide 16, and holding device 15 together with workpiece 2, during the rolling process 18 stroke adjuster for slide 16 and holding device 15

19 direction of stroke adjustment of slide 16 at the approach or removal of holding device 15 with respect to rolling head 11

2 workpiece (blanks 201, 203, 205 of rack 202, 204, 206), solid or hollow 20 toothing of workpiece 2 (202, 204, 206)

201 solid blank 2010 flattened portion on blank 201

202 solid, toothed rack, manufactured from blank 201

203 hollow, round, blank 204 hollow toothed rack, manufactured from blank 203

205 hollow, polygonal, blank 206 hollow, toothed rack, manufactured from blank 205

Apparatus 1 has a frame 10 in which a rolling head 11, rotatably journalled about its rolling head axis, is driven, via a rolling head drive 13 in the direction of rotation indicated by arrow 14.

Rollers 111 are freely rotatably journalled, in rolling head 11, along a helical line 112, so that they can rotate, in a planetary manner, with rolling head 11. These or other rollers could also be arranged along several helical lines in a manner not specifically illustrated.

Figure 6:
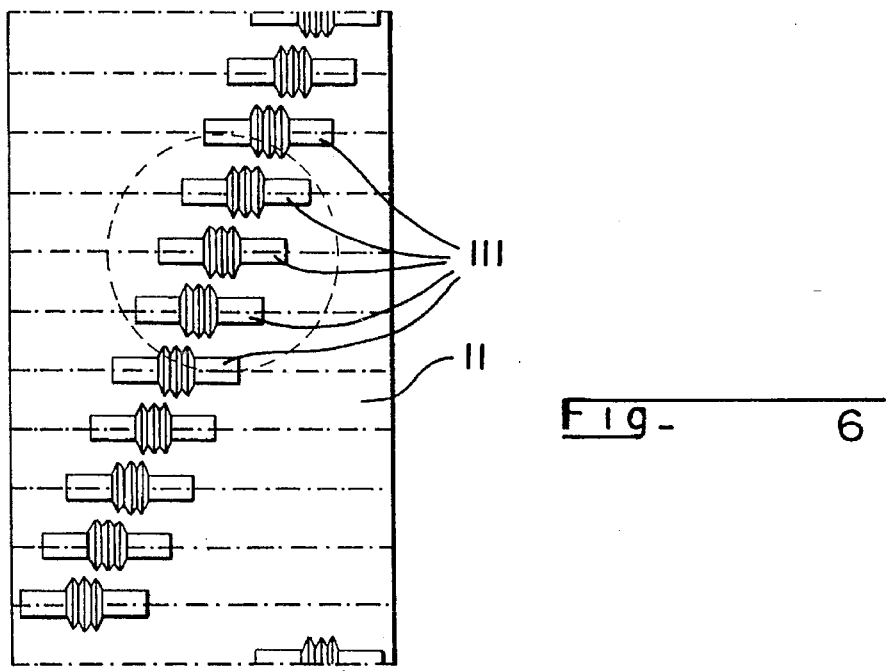
FIG. 6 is a developed view of the rolling head with all its rollers.
Figure 6A:
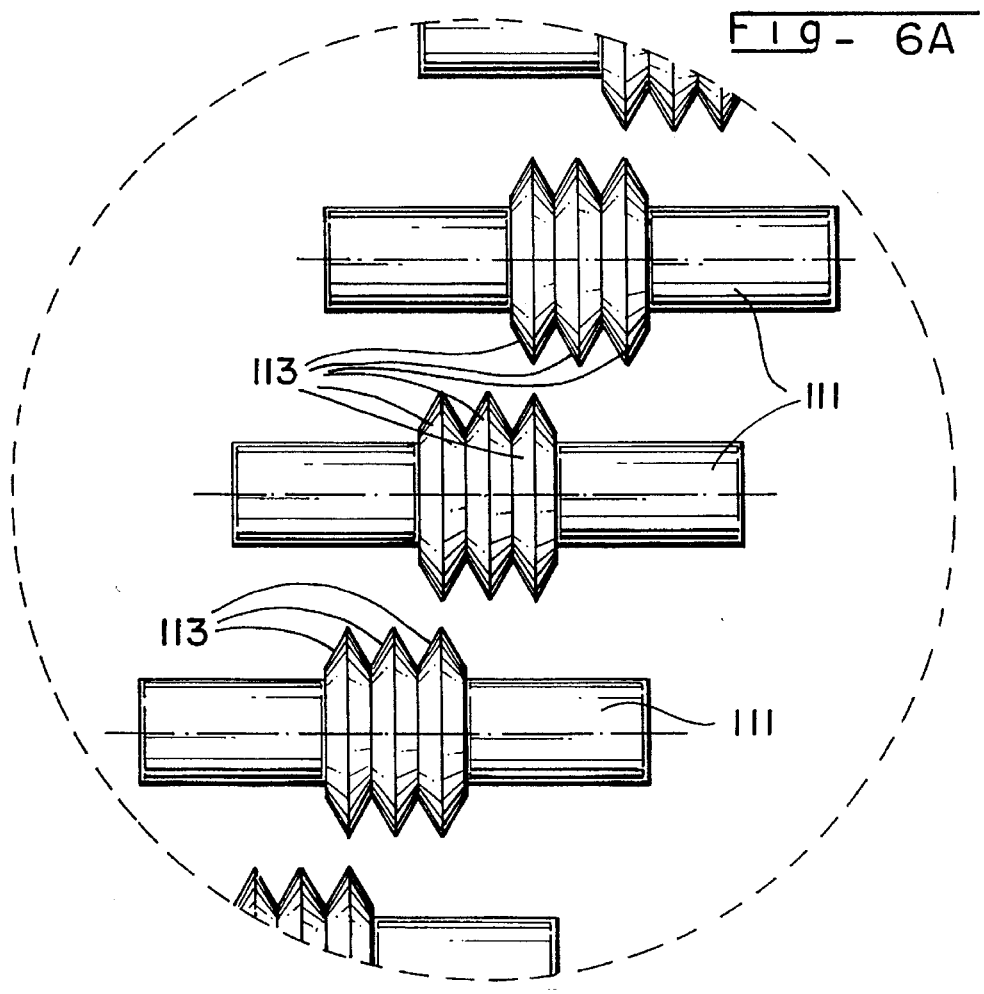
FIG. 6A is a greatly enlarged cut-out portion of the developed view.

Each roller 111 includes three forming ring ribs 113, shown in FIG. 6A in such a manner that, the two outer forming ring ribs, with regard to their engagement with workpiece 2, overlap in the direction of the axis 12 of the rolling head. Differing numbers of ring ribs can also be used on rollers arranged on one or several helical lines. Particularly favorable is a roller with one forming ring rib.

Frame 10 includes a holding device 15 for retaining workpiece 2, with holding device 15 being attached to slide or carriage 16 and, which together with slide 16 is moved underneath and past rolling head 11 by advancing or feeding means 17, usually automatically.

In order to advance the workpiece to the rolling head, slide 16 is adjustable, via a stroke adjuster 18, in a stroke adjustment direction, indicated by the upper part of double-headed arrow 19. For roll forming a rack, workpiece 2 is retained in holding device 15 and, via stroke adjuster 18, workpiece 2 is advanced toward rolling head 11 in such a manner that rollers 111 can properly engage workpiece 2. Rolling head 11 turns in its rotational direction 14 at a suitable speed or number of revolutions whereby the freely rotatable rollers 111 journalled in rolling head 11 revolve with rolling head 11 in a planetary manner.

Feeding means 17 are utilized for advancing slide 16 and holding device 15, together with workpiece 2, in slide feed direction, indicated by double-headed arrow 170, underneath rolling head 11. At that time rollers 111 engage workpiece 2 and produce toothing 20 in one pass therethrough, wherein forming ring rib 113 predominately displaces workpiece material from the bottom land area of the toothing to the top land area of the toothings.

If a rack is to be formed from a solid workpiece blank 201, it may in practice be necessary to initially prepare a blank having a specifically formed flattened or relieved portion 2010 prior to the toothing operation, with relieved portion 2010, whose shape is generally determined empirically, being produced via cutting or machining. As shown in FIG. 7 an expensively produced concave form of the relieved portion may become necessary. This relieved portion must be shaped very precisely when the top land area of the toothing is also formed during the production or rolling of the rack.

However, if a hollow blank, such as 203 or 205 is used then the working step for the production of the noted relieved portion can be eliminated. Thus, FIG. 9 illustrates a round, hollow, blank which can, without any prior preshaping, be directly formed or cold-rolled into a rack, while FIG. 11 illustrates a polygonal, hollow blank 205 which can also, without any prior preshaping, be directly cold formed into a rack.

The following working example has been successfully utilized for the production of a rack having 28 teeth at a module of 2.5, starting with a solid blank 201 of heat treatable steel. A rolling head is utilized similar to illustrated rolling head 11 which is equipped with thirteen rollers, with these rollers, similar to illustrated rollers 11 each having three forming ring ribs 113, and which in the previously-described manner, relative to their engagement with the workpiece, partially overlap each other. The rolling head is driven at a speed of 1250 revolutions per minute.

An angulation of the workpiece at 7.5 degrees, relative to the axis of the rolling head, produces, inclusive of the inlet portion, a rolling length of 60 mm. The feed advance is 1000 mm per minute, that is 0.8 mm per rolling head revolution so that the rolling time for producing the noted rack takes 0.06 minutes. The rack, as produced in the noted manner, is post induction hardened, with the toothing quality surpassing those which are normally producing via a machining or cutting process. Hollow, round, or polygonal, blanks, such as those shown at 203 (FIG. 9) and 205 (FIG. 11) can also be cold formed in a similar manner.

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

What is claimed is:

1. A method for cold forming toothings on a rack, said method comprising:

initiating relative motion between a workpiece and a rolling head, said rolling head having a plurality of freely rotating rollers;

drivingly revolving said rolling head about a rolling head axis;

relatively moving a workpiece blank, to be formed into said toothings on said rack, transversely to said rolling head axis, during said relative motion with reference to said rolling head axis so that said rollers, rotatably journalled in said rolling head and revolving with said rolling head in a planetary manner, engage said workpiece with said rollers, each of said rollers having one tooth space-form-type forming ring rib;

performing in quick and overlapping succession, a single rolling process relative to one tooth space form; and displacing, predominantly from a bottom land area of the toothings to a top land area of the toothings, workpiece material, as a result of the cold forming of said workpiece blank, via said forming ring ribs of said rollers of said rolling head, wherein during said engaging step, each of said rollers engages said workpiece blank so as to produce only one of the toothings being formed on said workpiece blank via said rollers.

2. The cold forming method of claim 1, wherein during said engaging step, a plurality of single rollers, journalled in said rolling head in a partially overlapping manner in the axial direction, engage partially overlapping portions of the toothings of said workpiece blank to be formed into said rack.

3. The cold forming method of claim 1, including the step of cold rolling a tooth top land area.

4. A toothed rack produced via the method of claim 1.

5. The toothed rack of claim 4, wherein said toothed rack is of solid construction.

6. The toothed rack of claim 4, wherein said toothed rack is of hollow construction.

7. An apparatus for cold rolling toothings on a rack, said apparatus comprising:

a frame;

a holding device for clamping a workpiece blank;

a driven rolling head, rotatable about its own axis;

means for feeding said workpiece blank in a feed direction transverse to the rolling head axis between said holding device and said rolling head;

adjustment means for controlling the feed motion of said workpiece blank to said rolling head; and said rolling head including a plurality of rollers, each roller having one tooth spaced-type forming ring rib, said rollers being freely rotatably journalled in said rolling head, said rollers revolving in a planetary type manner with said rolling head in order to engage said workpiece blank, with each of said rollers engaging said workpiece blank so as to produce only one of the toothings being formed on said workpiece blank via said rollers.

8. The apparatus of claim 7, wherein said rollers are arranged on said rolling head in a successively offset manner.

9. The apparatus of claim 7, wherein each of said rollers is arranged next to an adjacent roller, in the axial direction, free of overlap in profile.

10. The apparatus of claim 7, wherein the rollers in said rolling head, in the axial direction, partially overlap each other in profile.

11. The apparatus of claim 8, wherein each of said rollers is arranged next to an adjacent roller, in the axial direction, free of overlap in profile.

12. The apparatus of claim 8, wherein the rollers in said rolling head, in the axial direction, partially overlap each other in profile.

\* \* \* \* \*